United States Patent [19]
Mori et al.

[11] Patent Number: 4,770,908
[45] Date of Patent: Sep. 13, 1988

[54] PROCESS FOR PREPARING POROUS CERAMIC MEMBRANE

[75] Inventors: Kazutaka Mori; Kikuji Tsuneyoshi, both of Kanonshin, Japan

[73] Assignee: Mitsubishi Jukogyo Kabushiki Kaisha, Tokyo, Japan

[21] Appl. No.: 59,637

[22] Filed: Jun. 8, 1987

[30] Foreign Application Priority Data

Jan. 8, 1987 [JP] Japan ............................ 62-1002

[51] Int. Cl.$^4$ ............................................. B05D 3/02
[52] U.S. Cl. ................................. 427/376.2; 427/377; 427/380; 427/397.8
[58] Field of Search .................. 427/376.2, 377, 380, 427/397.8

[56] References Cited

U.S. PATENT DOCUMENTS

| | | | |
|---|---|---|---|
| 3,635,759 | 1/1972 | Howatt | 427/376.2 |
| 3,767,453 | 10/1973 | Hockstra | 427/380 |
| 4,073,999 | 2/1978 | Bryan et al. | 427/376.2 |
| 4,231,900 | 11/1980 | Kato et al. | 427/376.2 |

FOREIGN PATENT DOCUMENTS

| | | | |
|---|---|---|---|
| 58-153604 | 9/1983 | Japan | 427/376.2 |
| 59-162342 | 9/1984 | Japan | 427/376.2 |

OTHER PUBLICATIONS

2344 Journal of Chemical Engineering of Japan 19(1986), Feb., No. 1, Tokyo Japan, by Asaeda et al., "A Method for Fluid Mixture Separation."

Primary Examiner—Sadie L. Childs
Attorney, Agent, or Firm—Birch, Stewart, Kolasch & Birch

[57] ABSTRACT

A process for preparing a porous ceramic membrane to be employed for separating condensible gases and so on, which process comprises disposing on a porous ceramic substrate a layer of alumina sol formed by hydrolyzing an alcoholate or a chelate of aluminum, with subsequent drying and burning thereof, impregnating the resulting burnt body with a solution of an alcoholate or a chelate of aluminum in an organic solvent and subjecting then the aluminum alcoholate or chelate soaked in the burnt body to hydrolysis in a heated steam to cause conversion thereof into alumina sol, immersing the so treated body in an aqueous solution of sodium silicate, followed by, a heat treatment thereof in steam, after the body has been removed from the solution repeating the foregoing procedures until the capillary pores in the substrate would have sufficiently been filled by the alumina sol, immersing the so treated body finally in an aqeous solution of sodium silicate, followed by, a further heat treatment thereof in a steam after the body has been removed from the solution and subsequent subjecting the body to a hot water rinse to remove occluded sodium ions before drying the body.

7 Claims, 7 Drawing Sheets

PROCESS FOR PREPARING POROUS CERAMIC MEMBRANE

FIELD OF THE INVENTION AND RELATED ART STATEMENT

The present invention relates to a process for preparing porous ceramic membranes which are applicable as an apparatus for separating condensible gases, such as, separating water vapor (moisture) from air and so on, and for separating water from a mixed solution, such as, water mixed with alcohol.

Conventional porous ceramic filters have pore sizes, of which the smallest size is at a size of about 0.1 μm and such filters are used mainly for the removal of suspending particles. There is already in the market a porous ceramic membrane having a pore size of about 40 Å. While this membrane has a capability for ultrafiltration, it does not allow for a condensible gas to be readily separated from a gas mixture.

Heretofore, porous partition membranes of ultra-fine pores having average pore diameters ranging from several tens to several hundreds Å, which were prepared, for example, by press molding an organic synthetic resin powder, such as, fluororesin etc., or by sintering a ceramic powder or a metal powder, were not capable of being shaped into voluntary forms with sufficient ease, so as to permit to the use of such membranes for the separation of condensible gases. Therefore, in many cases technical measures have been employed for such a purpose. For example, a porous body or a material shaped into a wire net exhibiting high gas permeability with sufficient mechanical strength is combined with a thin porous partition membrane of ultra-fine porosity of the kind mentioned above to form a multilayer structure, in order to impart a reinforcement to the membrane.

Various measures have been proposed for shaping such a porous membrane of multilayer structure into a tubular form. In general, however, a porous tubular membrane is prepared by shaping a sheet of multilayered porous partition membrane into a tube and the adjoining seam is sealed by lap welding or by butt welding. Such a processing technique is, however, only applicable for materials having considerable flexibility, such as, metal and so on, and is quite difficult to apply the same processing techniques to materials which exhibit poor flexibility, such as ceramic and so on.

Since porous metal has lower strength due to the pores present, there is a limit to the radius of curvature for the smallest attainable tube diameter, and hence, shaping thereof into a thin tube has been very difficult.

In order to remedy such a difficulty, there has been proposed a technique for preparing a porous tubular membrane, in which a porous supporting tube is employed. While maintaining the porous tubular membrane concentrically with an externally or internally disposed pipe or core metal, the interstitial space between the porous supporting tube and the pipe or core metal is filled homogeneously with a powder. The powder is into a porous tube while jetting a gas into the interstitial space with vibration imparted to the porous supporting tube and to the pipe or core metal. This causes the powder particles filled within said interstitial space to be pressure-bonded onto the porous supporting tube by the static pressure built up therein forming a pressure-bonded layer of powder particles inside or outside the porous supporting tube (cf. Japanese Patent Application Laying Open No. 77410/1975). However, this technique is characterized with disadvantages due to the requisite homogeneous charging of the powder and is applicable only with respect to a very thin membrane, which makes the practice of the quite impracticable.

OBJECT AND SUMMARY OF THE INVENTION

The present invention has been realized under the above circumstances. The present invention provides for a process for preparing porous ceramic partition membrane having a very small pore size which is capable of removing condensible components from gas mixtures by capillary condensation. This would allow for a free choice of the size and shape of the membrane.

Thus, the present invention provides for a process for preparing a porous ceramic membrane to be employed for separating condensible gases and so on, said process comprising (1) disposing on a porous ceramic substrate a layer of alumina sol, said alumina sol formed by hydrolyzing an alcoholate or a chelate of aluminum, drying and burning the layer disposed on the substrate to form a porous ceramic substrate having a burnt alumina sol layer disposed thereon, (2) impregnating the burnt layer disposed on the substrate with a solution of an alcoholate or a chelate of aluminum in an organic solvent and subjecting the impregnated burnt layer to hydrolysis in heated steam to cause a conversion thereof into alumina sol, (3) immersing the so treated substrate with the layer of (2) disposed thereon in an aqueous solution of sodium silicate and subjecting the immersed substrate to a heat treatment in steam after it has been removed from the solution, (4) repeating the above procedures of 1 to 3 until the capillary pores in the substrate would have sufficiently been stuffed by the alumina sol, (5) immersing the so treated resultant product of (4) finally in an aqueous solution of sodium silicate and subjecting it, after it has been removed from the solution, to a further heat treatment in steam and thereafter to a hot water rinse to remove occluded sodium ions, before being dried.

Explaining the process according to the present invention, a porous substrate of a voluntary form having a relatively large pore size (in general, a pore diameter of over 1,000 Å) consisting of, such as, foamed silica product, sintered alumina, mullite or the like is employed, on which a layer of alumina sol (AlOOH) formed by hydrolyzing an alcoholate or a chelate of aluminum is deposited and the alumina sol layer is then dried and burnt to form a coating layer of alumina ($Al_2O_3$).

The hydrolysis of the aluminum alcoholate or aluminum chelate herein is performed in general in a hot water of 60°–100° C., in saturated steam or the like. It is preferable to incorporate an after-treatment of the alumina sol solution by adding nitric acid, hydrochloric acid or so on to cause peptization thereof, in order to improve the uniformity and mechanical strength of the alumina coating layer obtained.

It is preferable to perform the drying of the alumina sol layer at a temperature of 100°–200° C. and the burning thereof at a temperature of 400°–600° C.

Since it is not able to attain sufficient fill-up of the capillary pores in the substrate with the alumina sol by a single application of the operation sequence of deposition, drying and burning of the alumina sol layer and since there is a danger of crack formation due to shrinkage upon the drying, it is preferable to repeat this sequence of operations several times.

Now, the thus formed alumina coating layer on the substrate is then impregnated with a solution of an alcoholate or a chelate compound of aluminum in an organic solvent to fill up the fine pores of the alumina coating layer, whereupon the organic solvent is volatilized off and the aluminum alcoholate or the aluminum chelate remaining within the fine pores is subjected to a steam treatment to cause it to be hydrolyzed into alumina sol.

Thereafter, the porous body so treated is immersed in an aqueous solution of sodium silicate having a concentration of 0.01–0.5 mole/l and is then taken out of the solution, in order to subject it to a heat treatment in a steam heated at a temperature of 120°–150° C. to stabilize the alumina sol layer formed on the substrate.

The above procedures should be repeated until the capillary pores of the substrate have been stuffed by alumina sol sufficiently.

It is enough to use, as the organic solvent, those which will dissolve the aluminum alcoholate or the aluminum chelate, such as for example, acetone, benzene, xylene, tetrachloroethylene (such as Daiflon: Trade Name of the firm Daikin Kogyo Co., Ltd.) and so on.

The steam to be used for effecting said hydrolysis should have a temperature of 100° C. or higher, preferably a temperature of 120°–150° C., in order to avoid dew condensation.

In order to stabilize the so formed alumina layer and to effect final fill-up of the fine pores of the alumina coating layer, the last operation is incorporated which comprises immersing the substrate having the porous alumina layer supported thereon in an aqueous solution of sodium silicate of a concentration of 0.01–0.5 mole per liter at a solution temperature of 90° C. or higher, subjecting the thus soaked body, after it is taken out of the solution, to a heat treatment in a steam of 80°–100° C. and immersing it subsequently in a hot water, preferably in boiling water, to remove the occluded sodium ion content by dissolving it.

Examples of the aluminum alcoholate to be employed in the process according to the present invention include aluminum isopropoxide, aluminum-2-butylate and so on, and examples of the aluminum chelate include aluminum tris(ethyl acetoacetate), ethyl acetoacetato-aluminum diisopropylate and so on.

It is possible by the process according to the present invention to prepare a porous ceramic membrane having micronous pores with better reproducibility.

Using the ceramic membrane obtained by the process according to the present invention, it is possible to attain separation of condensible components in gases. For instance, removal of moisture (water vapor) in the air can be achieved by maintaining the inside space of the membrane at a reduced pressure by evacuating it and exposing the membrane to the external atmosphere of said moisture-containing air, wherein the moisture in the air will condense within the fine pores in the coating layer of the membrane and penetrates the membrane to the internal space held at a reduced pressure and is exhausted therefrom, and thus, the moisture content in the air will be decreased. For the practical application of the membrane in this purpose, a moisture removal apparatus in a closed air-conditioning system and so on may be considered.

DETAILED DESCRIPTION OF PREFERRED EMBODIMENTS

Below, the present invention will further be described by way of Examples with reference to FIGS. 1 to 9 appended.

For preparing porous ceramic membrane using a porous alumina substrate, the following procedures were carried out.

Figure 1:
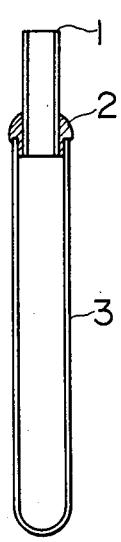
FIG. 1 illustrates one embodiment of the process according to the present invention, in which a porous tubular substrate connected with a glass tube, before the starting of the process, is shown in a sectional view.

As shown in FIG. 1, tubular porous alumina substrate 3 having an average pore size of about 1 $\mu$m connected with glass tube 1 sealed by alumina cement layer 2 was employed.

For the solution of alumina sol source, two kinds of solutions were prepared by dissolving 22.7 g of aluminum isopropylate in 100 ml of water and subjecting the solution to a hydrolysis at a temperature of 80° C. and then adding thereto 1.5 ml of concentrated nitric acid for causing it to peptize to form a higher concentration sol solution, on the one hand, and by dissolving 11.4 g of aluminum isopropoxide in 100 ml of water and subjecting it to a hydrolysis at a temperature of 80° C. and then adding thereto 0.7 ml of concentrated nitric acid to cause peptization to form a lower concentration sol solution, on the other hand.

Figure 2:
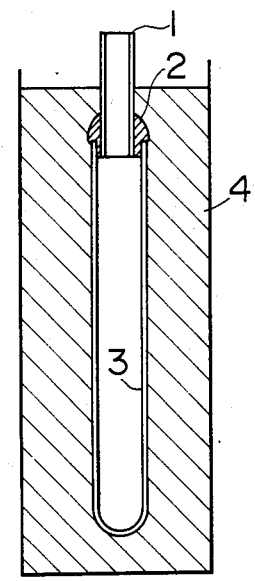
FIG. 2 depicts the substrate of FIG. 1 in a state immersed in an aluminum alcoholate solution.

Porous substrate 3 as shown in FIG. 1 was then immersed in sol solution 4 as shown in FIG. 2. The porous substrate was immersed at first in the higher concentration sol solution for 10 seconds and was then taken out of the solution and dried by standing it in the atmosphere for 1 hour, followed by a drying at a temperature of 200° C. and a heat treatment at a temperature of 400° C. for 15 minutes. This procedure was repeated once more and the substrate was then immersed in the lower concentration sol solution for 10 seconds and was then taken out of the solution and dried by standing in the atmosphere for 1 hour, followed by a drying at a temperature of 200° C. and subsequent heat treatment at a temperature of 400° C. for 15 minutes. The above procedures were repeated three times in total.

Figure 3:
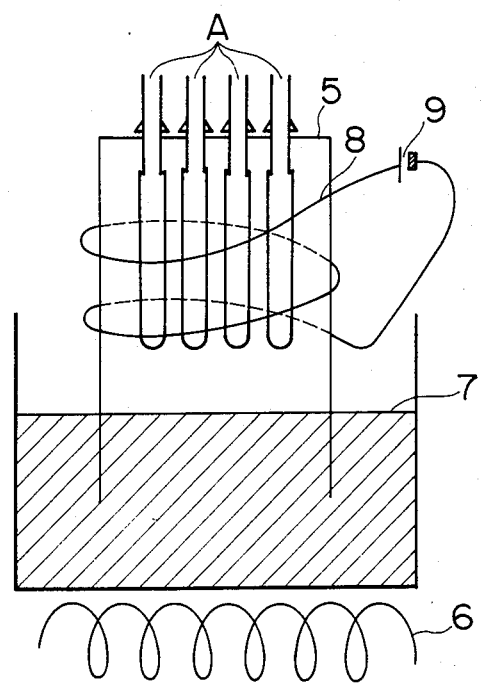
FIG. 3 illustrates the process step in which several tubular porous substrates which have been immersed in the aluminum alcoholate solution are subjected to a hydrolysis by heated steam.

On the other hand, a solution of 5% by weight of aluminum isopropylate in tetrachloroethylene was prepared. In this solution, the substrate body having supported thereon the alumina sol coating layer formed by the foregoing process step was immersed for 30 seconds in a manner as suggested in FIG. 2. The substrate body was taken out of the solution and was held standing in the room for 5 minutes to remove the tetrachloroethylene solvent by volatilization. Then, the substrate so treated was kept at a temperature of 100° C. for 10 minutes in a manner as shown in FIG. 3 to cause aluminum isopropylate to be hydrolyzed. The so treated substrate was then immersed in an aqueous solution prepared by dissolving 2.5 g of sodium silicate in 100 ml of water for 30 seconds, before it was treated at a temperature of 150° C. for 10 minutes in a manner as suggested in FIG. 3. The above sequence of operations was repeated three times in the total.

FIG. 3 illustrates the condition of hydrolysis treatment of several substrate tubes (A) each having supported thereon an alumina sol coating layer, which were suspended in vessel 5 provided with heater 6 for generating water steam by heating water sump 7. Vessel 5 was provided with heater 8 for heating the vessel and for heating the steam inside the vessel and with power source 9 for heater 8. In this Example, Water sump 7 was heated to 95° C. and the internal atmosphere of the vessel was maintained at 150° C.

The substrate treated as above was finally immersed for 5 minutes in an aqueous solution of sodium silicate prepared by dissolving 0.54 g of sodium silicate in 100 ml of water and heated at a temperature of 93° C. The so immersed substrate was maintained for 12 hours in saturated steam at a temperature of 90° C. and was then immersed in boiling water for 2 hours to remove sodium ion by dissolving therein, before it was dried by standing in the atmosphere.

The porous ceramic membrane with the substrate as prepared by the above procedures was examined for their pore size distribution using nitrogen absorption method and mercury compression method.

Figure 4:
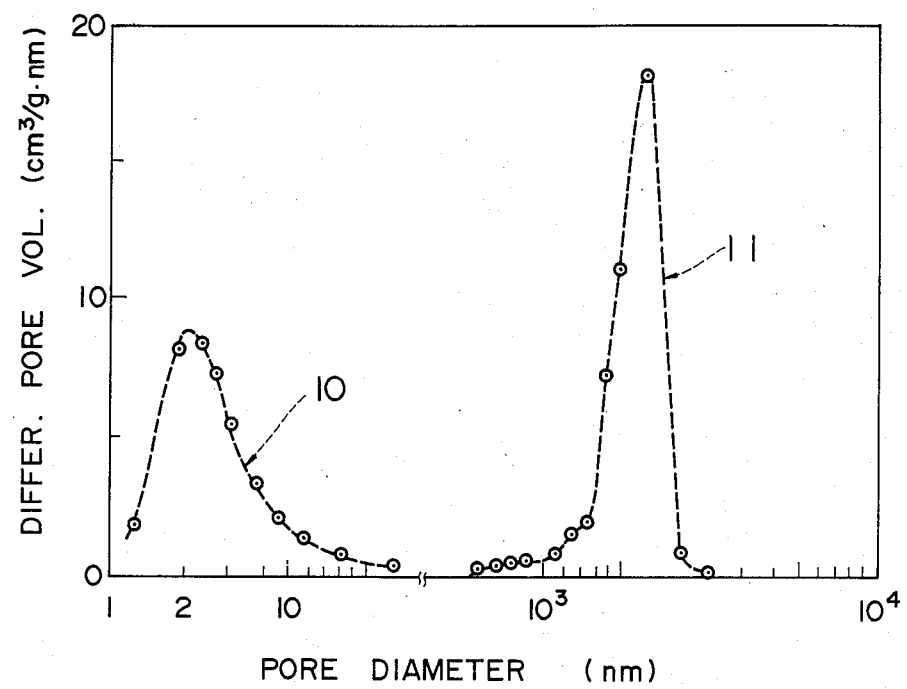
FIG. 4 shows a diagram of pore size distribution of the porous membrane prepared by one example of the process according to the present invention.

The results of the observation are recited in FIG. 4, in which abscissa represents the pore diameter in nm and the ordinate represents the differential pore volume in cm$^3$/g·nm. In this FIG., curve 10 indicates the pore size distribution for the porous coating layer determined by the nitrogen adsorption method and curve 11 indicates the pore size distribution for the substrate determined by the mercury compression method.

EXPERIMENTAL EXAMPLE 1

Figure 5:
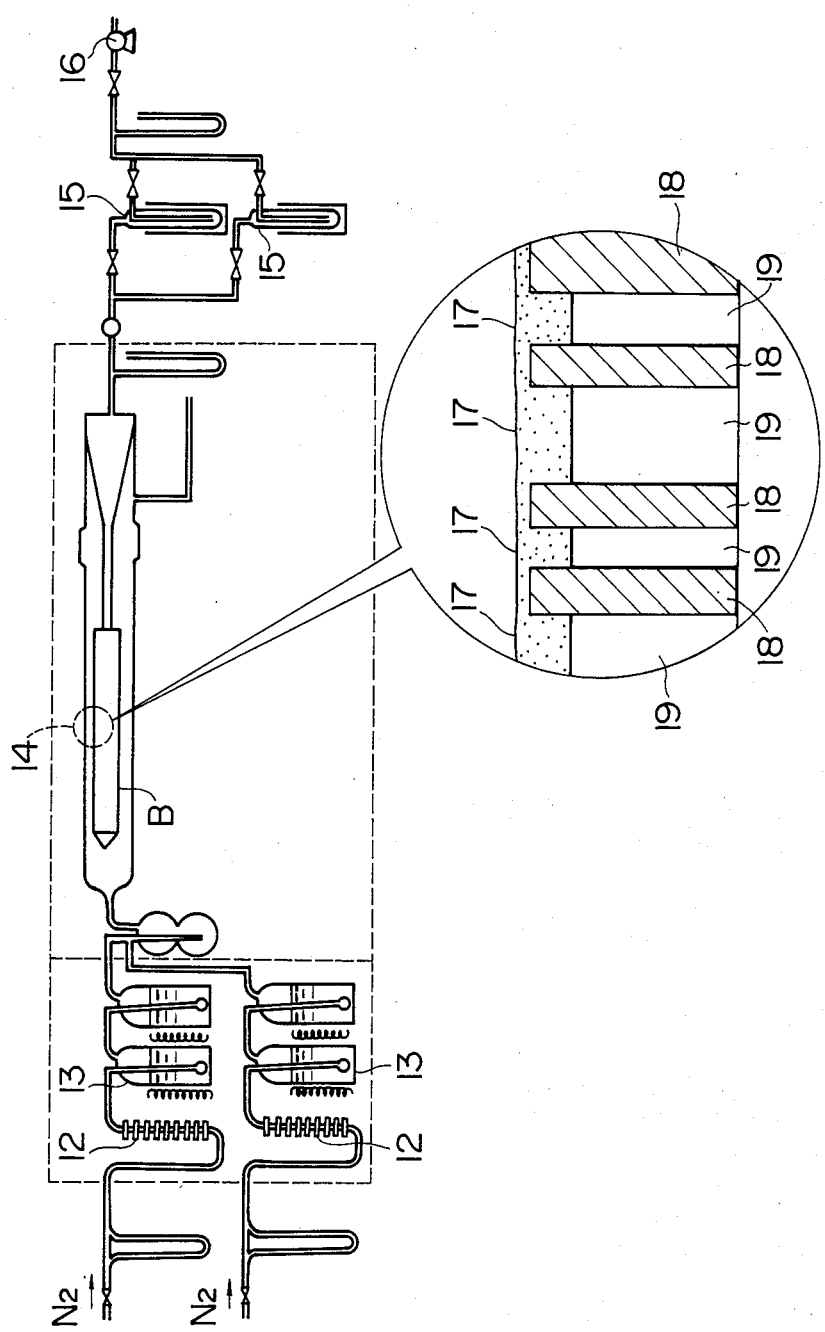
FIG. 5 illustrates the entire apparatus for determining the rate of penetration of water vapor through the porous membrane as employed in the Experimental Example 1 together with a partly enlarged sectional view of a portion of the membrane.

Using tubular porous membrane (B) prepared as in the above Example, an experiment for the separation of water vapor from moistened nitrogen gas is carried out by a testing apparatus as shown in FIG. 5.

In the apparatus shown in FIG. 5, 12 indicates a spiral heating tube for heating nitrigen gas and 13 represents the moistening section of the apparatus effecting moistening of the nitrogen gas by bubbling the nitrogen gas through a layer of water. 14 denotes the section for removing water vapor from the moistened nitrogen gas and numeral 15 represents a cold trap for collecting the moisture penetrated through the porous membrane after it is condensed into liquid droplets or mist. 16 is a vacuum pump.

A part of the apparatus of FIG. 5 is shown in an enlarged sectional view in FIG. 5. Here a portion of the porous alumina membrane and the underlying substrate is shown in an enlarged view, in which 17 denotes the fine porous ceramic coating layer formed from the alumina sol fine particles filled within capillary pore 19 of the substrate and 18 is the substrate.

Experiments were carried out as follows:

First, nitrogen gas is caused to pass through spiral heating tube 12 and through moistening section 13, in order to moisten the nitrogen gas. The so moistened nitrogen gas is introduced into separation section 14. On the other hand, a constant vacuum pressure is maintained inside tubular porous membrane (B) using vacuum pump 16 while cooling cold trap 15 with liquid nitrogen. Thereby capillary pores 19 in the substrate are maintained also at the same vacuum pressure.

Figure 6:
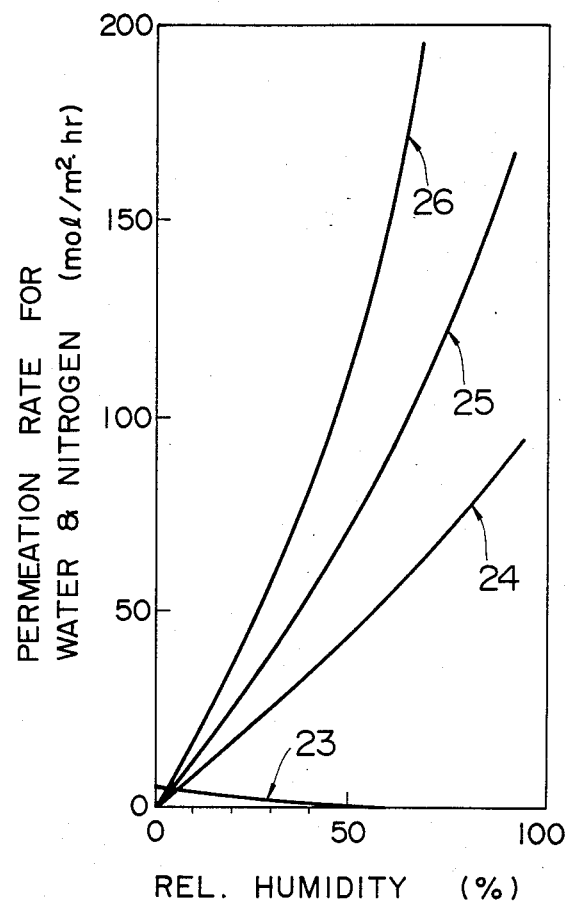
FIG. 6 is a graphic diagram showing the relationship between the rate of penetration of water vapor and the relative humidity observed in the Experimental Example 1.
Figure 7:
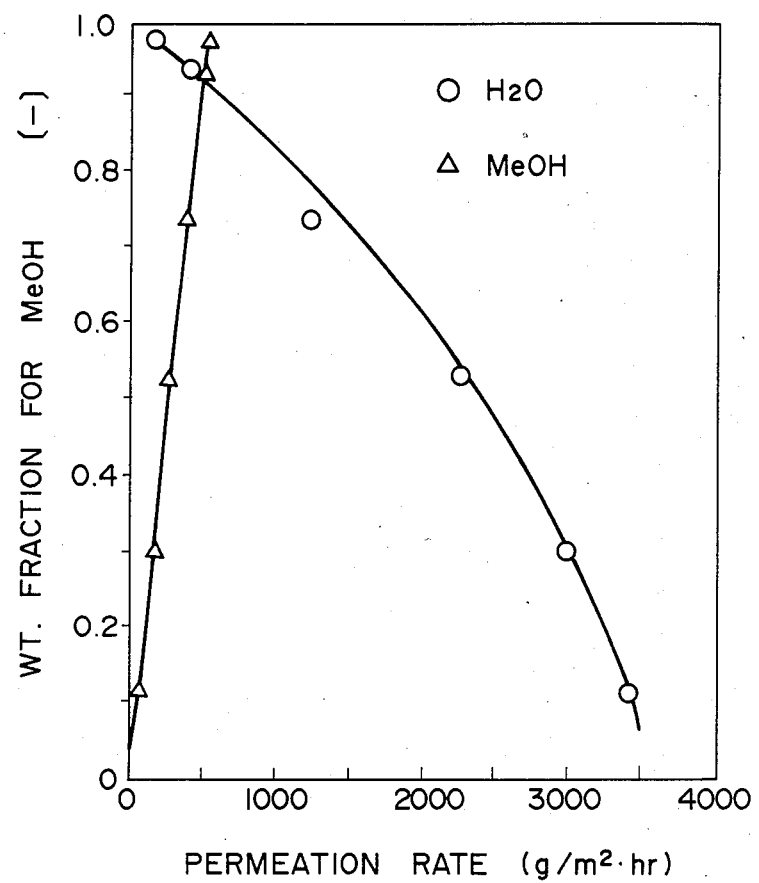
FIG. 7 is a graph showing the partition rate data for a mixed solution of methanol/water observed in the Experimental Example 2.
Figure 8:
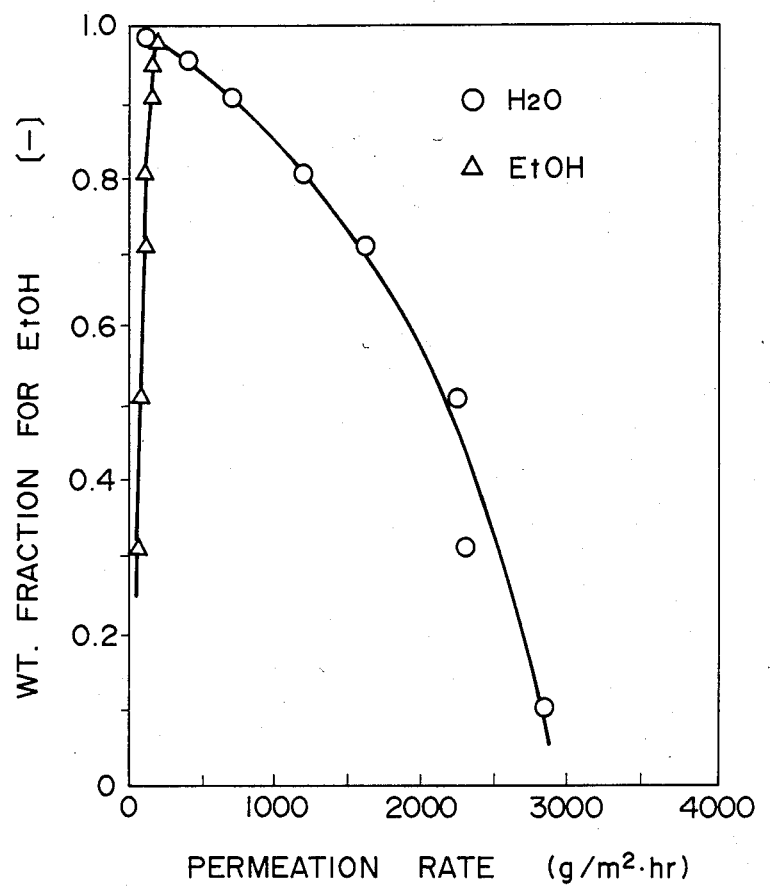
FIG. 8 shows the diagram of partition rate observed for a mixed solution of ethanol/water.
Figure 9:
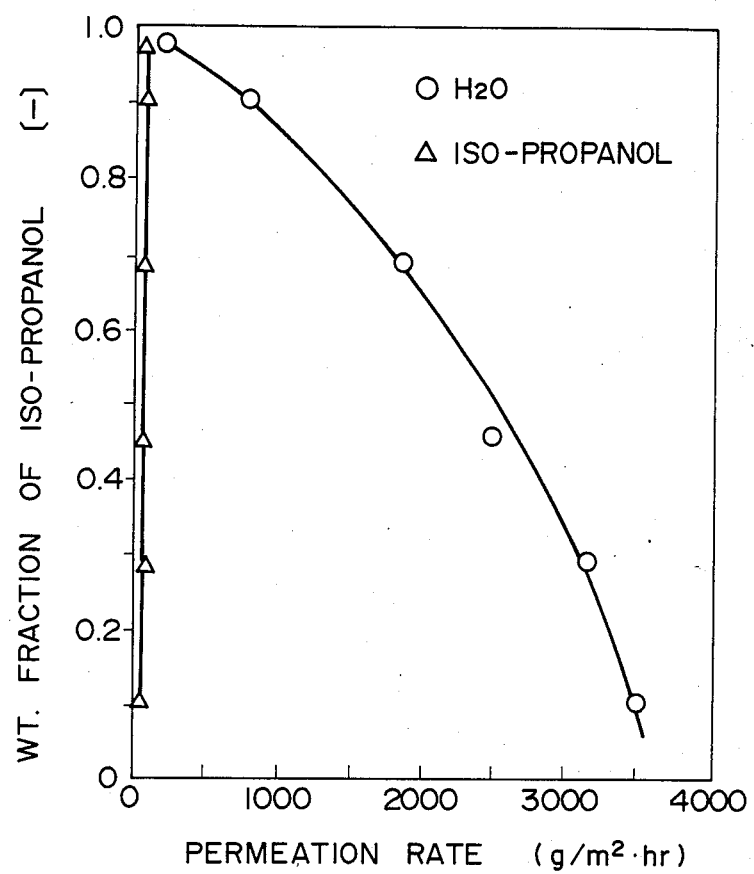
FIG. 9 is the diagram of partition rate observed for a mixed solution of isopropanol/water.

The moisture in the nitrogen gas will be subjected to capillary condensation within the fine pores inside ceramic coating layer 17 and will fill up the fine pores to build up a liquid seal thereof. Since the capillary pores 19 of the substrate are maintained at the above mentioned constant vacuum pressure, a driving force is built up by the difference between the water vapor partial pressure at the ambient temperature and said vacuum pressure. Therefore, the condensed water will be volatilized inside capillary pore 19 of the substrate, so that the condensed water will after all penetrate through porous ceramic coating layer 17 towards the capillary pores 19. The thus penetrated and evaporated water vapor will then condense in the cold trap 15 and the amount of condensed water is weighed to determine the rate of penetration of water. In FIG. 6, the penetration rate thus observed are given as a graphic diagramm. The abscissa of FIG. 6 represents the relative humidity in % and the ordinate indicates the penetration rate in mole/m$^2$·hr. Curve 23 indicates the penetration rate for nitrogen, the curves 24, 25 and 26 each represent the penetration rate for water vapor at 40°, 60° and 80° C. respectively. As the relative humidity decreases, a little leakage of nitrogen gas occurs, what may be due to the fact that the water layer formed in the fine pores by the capillary condensation will become thinner and even broken down, resulting in an incomplete liquid seal.

EXPERIMENTAL EXAMPLE 2

The porous tubular ceramic membrane as prepared in the Example was immersed in each of mixed solutions of water/methanol, water/ethanol and water/isopropanol in a similar manner as indicated in FIG. 2. Glass tube 1 was connected to the vacuum pump. The amount of water and that of alcohol passed through the porous membrane and entering into the inside space of the tubular membrane are detected using the cold trap as in Experimental Example 1. Each test is carried out at a temperature of 50° C. The results are summarized graphically in FIGS. 7, 8 and 9. The penetration rate of water quite surpasses that of the alcohols, so that it is made clear that concentration of liquid alcohols is possible.

There are differences between the penetration rates for methanol, ethanol and isopropanol, so that a preferential penetration of methanol from a mixture of these alcohols will be achieved, permitting thus to effect separation thereof.

The penetration rate will be decreased as the molecular weight becomes greater, so that it may be possible to separate a compound of smaller molecular weight from those of larger molecular weights.

While the properties of the ceramic membrane prepared by the process according to the invention will somewhat vary in accordance with the gas temperature, content of the condensible components and so on, it reveals better performance for separating condensible components from gas mixtures and is also applicable even for separating volatilizable liquid components from liquid mixtures, so that considerable industrial profits will be realized.

We claim:

1. A process for preparing a porous ceramic membrane comprising the steps of:
    (a) disposing on a porous ceramic substrate having capillary pores a layer of alumina sol, wherein said alumina sol is prepared by hydrolyzing an alcoholate or a chelate of aluminum, drying and burning the layer disposed on the substrate to form a porous ceramic substrate having a burnt alumina sol layer disposed thereon,
    (b) impregnating the burnt layer disposed on the substrate with a solution of an alcoholate or a chelate of aluminum in an organic solvent,
    (c) subjecting the aluminum alcoholate or chelate impregnated in the burnt layer disposed on the substrate to hydrolysis in heated steam to cause a conversion thereof to alumina sol,
    (d) immersing the substrate having the alumina sol impregnate burnt layer disposed thereon in an aqueous solution of sodium silicate and subjecting said substrate to a heat treatment in steam after said substrate has been removed from said solution,
    (e) repeating steps (a), (b), (c), and (d) to fill the capillary pores of the substrate with alumina sol at least to the extent sufficient to enable the membrane to be capable of separating condensible gases, and
    (f) immersing the resultant product of step (e) in an aqueous solution of sodium silicate, subjecting said product to a heat treatment in steam after said product has been removed from said solution, thereafter subjecting said product to a hot water rinse treatment to remove occluded sodium ions and drying said product to form a porous ceramic membrane.

2. The process of claim 1, wherein the alumina sol of step (a) is prepared by hydrolyzing an alcoholate or a chelate of aluminum to form a hydrolyzed product and treating the hydrolyzed product with an acid to form a peptized product.

3. The process of claim 2, wherein the acid in nitric acid or hydrochloric acid.

4. The process of claim 1, wherein the alcoholate of aluminum of steps (a) and (b) is aluminum isopropylate.

5. The process of claim 2, wherein the disposing of step (a) comprises:
    immersing the substrate in a first aqueous aluminum sol solution to form a first disposed layer, followed by drying and burning to convert the layer to a first disposed burnt layer, and
    immersing the substrate with the first burnt layer disposed thereon in a second aqueous aluminum sol solution to form a second disposed layer, followed by drying and burning to convert the layer to a second disposed burnt layer,
    the first solution has an aluminum sol concentration which is higher than the second solution.

6. The process of claim 2, wherein the organic solvent of step (c) is tetrachloroethylene.

7. The process of claim 1, wherein the solution of step (d) comprises 2.5 g of sodium silicate in 100 ml of water and the solution of step (f) comprises 0.54 g of sodium silicate in 100 ml of water.

* * * * *